US011901773B2

(12) United States Patent
Nakamura et al.

(10) Patent No.: US 11,901,773 B2
(45) Date of Patent: Feb. 13, 2024

(54) ROTATING ELECTRIC MACHINE

(71) Applicants: SUMITOMO ELECTRIC INDUSTRIES, LTD., Osaka (JP); SUMITOMO ELECTRIC SINTERED ALLOY, LTD., Takahashi (JP)

(72) Inventors: Yuuichi Nakamura, Osaka (JP); Tomoyuki Ueno, Osaka (JP); Tatsuya Saito, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 401 days.

(21) Appl. No.: 17/272,994

(22) PCT Filed: Sep. 5, 2019

(86) PCT No.: PCT/JP2019/034940
§ 371 (c)(1),
(2) Date: Mar. 3, 2021

(87) PCT Pub. No.: WO2020/059515
PCT Pub. Date: Mar. 26, 2020

(65) Prior Publication Data
US 2021/0288533 A1 Sep. 16, 2021

(30) Foreign Application Priority Data
Sep. 18, 2018 (JP) ................ 2018-173510

(51) Int. Cl.
*H02K 1/27* (2022.01)
*H02K 1/28* (2006.01)
(Continued)

(52) U.S. Cl.
CPC .......... *H02K 1/2795* (2022.01); *H02K 1/278* (2013.01); *H02K 1/28* (2013.01); *H02K 15/02* (2013.01)

(58) Field of Classification Search
CPC ........ H02K 1/2795; H02K 1/278; H02K 1/28; H02K 15/02; H02K 2213/03; H02K 1/02; H02K 1/2793; H02K 21/24
See application file for complete search history.

(56) References Cited

U.S. PATENT DOCUMENTS

2007/0200445 A1* 8/2007 Yamagiwa ............... H02K 7/14
310/156.32
2011/0057532 A1* 3/2011 Marquardt ............ H02K 21/24
310/156.35
(Continued)

FOREIGN PATENT DOCUMENTS

JP 2007-306685 A 11/2007
JP 2011-30334 A 2/2011
(Continued)

OTHER PUBLICATIONS

Watanabe, Asako, et al., "Thin and High-Torque Axial Gap Motor Using Soft Magnetic Powder Cores," Jan. 2018, SEI Technical Review, No. 192, pp. 119-125.

*Primary Examiner* — Thomas Truong
(74) *Attorney, Agent, or Firm* — Faegre Drinker Biddle & Reath LLP

(57) ABSTRACT

This axial gap motor includes: a stator; and a rotor provided so as to be opposed to the stator in an axial direction. The rotor includes an annular rotor yoke, and a plurality of magnets provided to contact one surface of the rotor yoke so as to be arranged at predetermined intervals along a circumferential direction with magnetic poles thereof being different alternately. The one surface includes a plurality of facing areas facing and contacting the plurality of magnets, and a (Continued)

non-facing area not facing the plurality of magnets. The non-facing area includes partial areas each located between a pair of the facing areas adjacent to each other in the circumferential direction among the plurality of facing areas. The partial areas are formed to be recesses recessed in the axial direction relative to the facing areas.

5 Claims, 9 Drawing Sheets

(51) Int. Cl.
*H02K 1/2795* (2022.01)
*H02K 1/278* (2022.01)
*H02K 15/02* (2006.01)

(56) References Cited

U.S. PATENT DOCUMENTS

2011/0133596 A1* 6/2011 Asano ................... H02K 21/24
310/156.43
2018/0198335 A1 7/2018 Inoue et al.

FOREIGN PATENT DOCUMENTS

| JP | 2011030334 A | * | 2/2011 |
| JP | 2016-201961 A | | 12/2016 |
| JP | 2017-041937 A | | 2/2017 |

* cited by examiner

ROTATING ELECTRIC MACHINE

TECHNICAL FIELD

The present disclosure relates to a rotating electric machine.

This application claims priority on Japanese Patent Application No. 2018-173510 filed on Sep. 18, 2018, the entire content of which is incorporated herein by reference.

BACKGROUND ART

In recent years, an axial gap motor which has a thin size and provides high torque has been paid attention to.

In the axial gap motor, a gap between a rotor and a stator is provided in the axial direction (see, for example, Non Patent Literature 1).

CITATION LIST

Non Patent Literature

NON PATENT LITERATURE 1: Asako Watanabe, et al., "Thin and High-Torque Axial Gap Motor Using Soft Magnetic Powder Cores", January 2018, SEI technical review, No. 192, pp. 119-125

SUMMARY OF INVENTION

A rotating electric machine according to an embodiment includes: a stator; and a rotor provided so as to be opposed to the stator in an axial direction. The rotor includes an annular rotor yoke, and a plurality of magnets provided to contact one surface of the rotor yoke so as to be arranged at predetermined intervals along a circumferential direction with magnetic poles thereof being different alternately. The one surface includes a plurality of facing areas facing and contacting the plurality of magnets, and a non-facing area not facing the plurality of magnets. The non-facing area includes partial areas each located between a pair of the facing areas adjacent to each other in the circumferential direction among the plurality of facing areas. The partial areas are formed to be recesses recessed in the axial direction relative to the facing areas.

DESCRIPTION OF EMBODIMENTS

Problems to be Solved by the Present Disclosure

Structures of axial gap motors include a double-stator structure in which stators are provided on both sides in the axial direction of a rotor, and a single-stator structure in which a stator is provided only on one side in the axial direction of a rotor.

Figure 8:
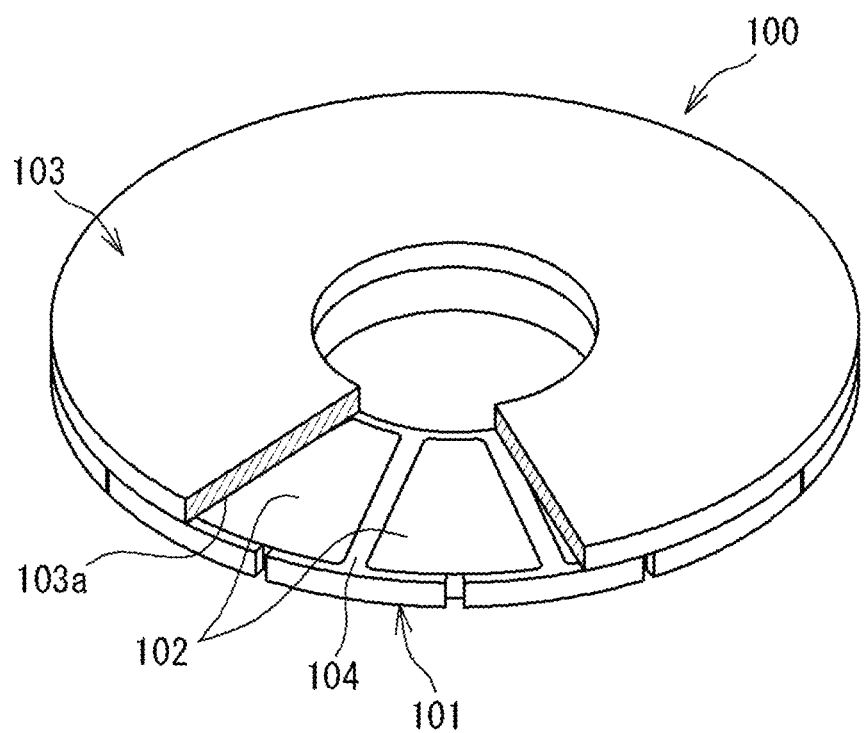
FIG. 8 is a perspective view of a rotor used in a conventional axial gap motor.

FIG. 8 is a perspective view of a rotor used in a conventional axial gap motor.

In FIG. 8, a rotor 100 used for the single-stator structure includes an annular body portion 101 having a plurality of magnets 102, and an annular rotor yoke 103 fixed concentrically to the body portion 101.

The plurality of magnets 102 are held by a holding member 104 made of a non-magnetic material, thus forming the annular body portion 101. The plurality of magnets 102 are arranged at predetermined intervals along the circumferential direction with their magnetic poles being different alternately.

The rotor yoke 103 is fixed with its one surface 103a contacting the body portion 101.

Figure 9:
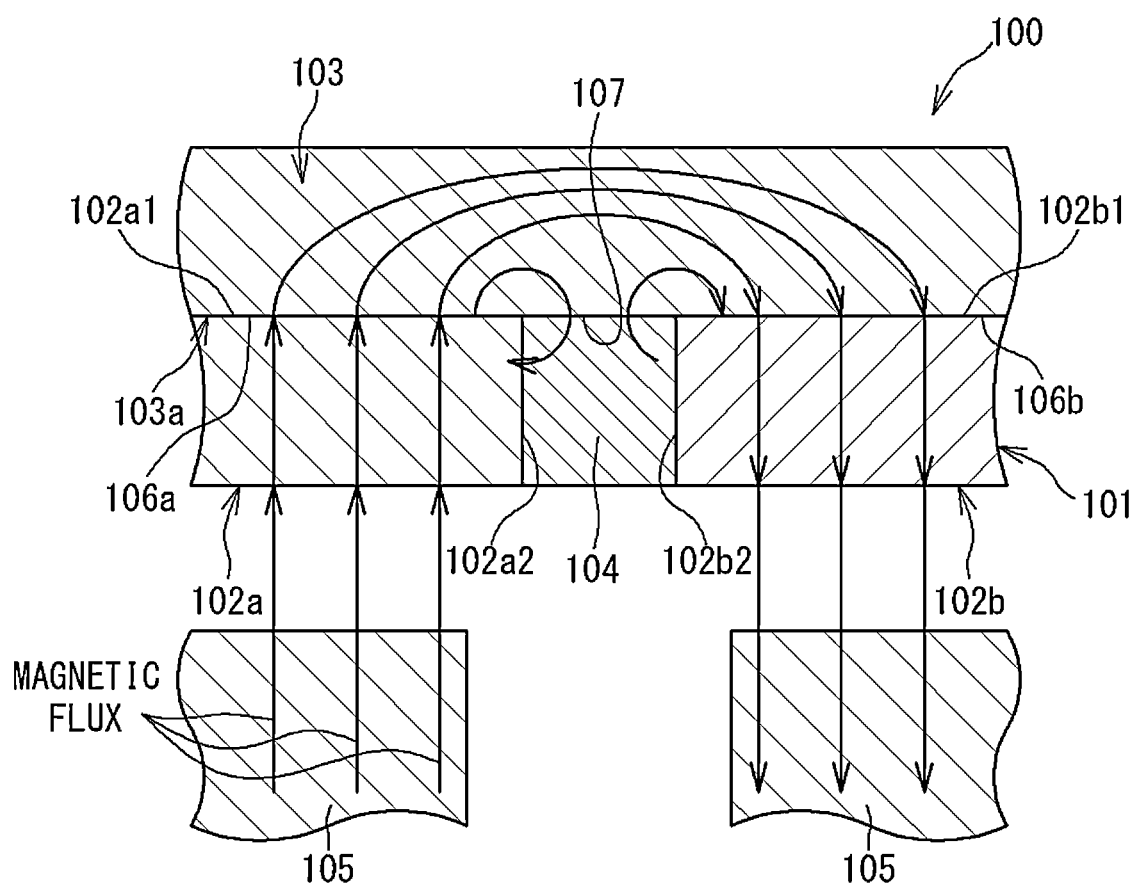
FIG. 9 is a sectional view showing a part of the conventional axial gap motor.

FIG. 9 is a sectional view showing a part of the conventional axial gap motor. In FIG. 9, arrows indicate a magnetic flux flowing through respective parts.

As shown in FIG. 9, the rotor 100 is provided so as to be axially opposed to tooth portions 105 which are iron cores provided so as to protrude on a stator and wound with coils.

A plurality of magnets 102a, 102b arranged at predetermined intervals in the circumferential direction and the holding member 104 interposed between the plurality of magnets 102a, 102b contact the one surface 103a of the rotor yoke 103.

Therefore, the one surface 103a of the rotor yoke 103 has facing areas 106a, 106b facing and contacting the magnets 102a, 102b, and a non-facing area 107 facing and contacting the holding member 104 without facing the magnets 102a, 102b.

In FIG. 9, a magnetic flux from the magnet 102a flows from a magnetic pole surface 102a1 of the magnet 102a which is an N pole, through the rotor yoke 103, to a magnetic pole surface 102b1 of the magnet 102b which is an S pole.

The flow of the magnetic flux from the magnet 102a to the magnet 102b becomes an magnetic flux linkage which is a magnetic flux penetrating the coils wound around the tooth portions 105.

The magnetic flux linkage influences output torque of the axial gap motor. That is, the greater the magnetic flux linkage is, the greater the output torque of the axial gap motor is.

However, there is a case where magnetic short-circuit occurs between a side surface 102a2 of the magnet 102a and the non-facing area 107 and between a side surface 102b2 of the magnet 102b and the non-facing area 107, so that, as shown in FIG. 9, a magnetic flux given from the magnetic pole surface 102a1 to the rotor yoke 103 flows from the non-facing area 107 to the side surface 102a2 before reaching the magnet 102b side, or a magnetic flux flowing from the magnet 102b toward the tooth portion 105 flows from the side surface 102b2 to the non-facing area 107.

When such magnetic short-circuit occurs, the magnetic flux linkage is reduced, thus causing reduction in output torque of the motor.

The present disclosure has been made in view of the above circumstances, and an object of the present disclosure is to provide a rotating electric machine that can increase the output.

Effects of the Present Disclosure

The present disclosure makes it possible to increase the output.

First, the contents of embodiments are listed and described.

[Outlines of Embodiments]

(1) A rotating electric machine according to an embodiment includes: a stator; and a rotor provided so as to be opposed to the stator in an axial direction. The rotor includes an annular rotor yoke, and a plurality of magnets provided to contact one surface of the rotor yoke so as to be arranged at predetermined intervals along a circumferential direction with magnetic poles thereof being different alternately. The one surface includes a plurality of facing areas facing and contacting the plurality of magnets, and a non-facing area not facing the plurality of magnets. The non-facing area includes partial areas each located between a pair of the facing areas adjacent to each other in the circumferential direction among the plurality of facing areas. The partial areas are formed to be recesses recessed in the axial direction relative to the facing areas.

In the rotating electric machine having the above configuration, on the one surface of the rotor yoke, of the non-facing area, a partial area between a pair of the facing areas adjacent to each other in the circumferential direction is formed to be the recess. Therefore, as compared to a case where there are no recesses as in the conventional example, a rotor yoke surface in the non-facing area can be more separated from a pair of the magnets contacting the pair of the facing areas. Thus, the magnetic resistance between the rotor yoke surface in the non-facing area and the pair of the magnets can be increased.

Therefore, the rotor yoke surface in the non-facing area and the pair of the magnets can be inhibited from being magnetically short-circuited, and reduction in the magnetic flux linkage due to short-circuit can be inhibited. As a result, a larger amount of magnetic flux linkage can be generated, whereby the output of the rotating electric machine can be increased.

(2) In the above rotating electric machine, a sectional shape of each recess across a range between the pair of facing areas may be such a shape that opening edges and a bottom of the recess are connected by curved surfaces.

In this case, in the recess, the distance between the bottom and a side wall portion from the opening edge to the bottom is inhibited from being shortened, and thus occurrence of magnetic short-circuit inside the recess can be inhibited.

(3) In the above rotating electric machine, opening edges of each recess formed by edges of the pair of facing areas may be located on magnetic pole surfaces of a pair of the magnets contacting the pair of facing areas among the plurality of magnets.

In this case, the opening width of the recess can be made greater than the predetermined interval between the pair of the magnets adjacent to each other in the circumferential direction, and thus the recess can be provided so as to assuredly include the non-facing area in the circumferential direction.

(4) In the above rotating electric machine, each recess may extend from an inner circumferential edge to an outer circumferential edge on the one surface.

In this case, when providing the recesses, it becomes unnecessary to perform adjustment and the like for at least their positions in the radial direction, so that it becomes easy to provide the recesses.

(5) In the above rotating electric machine, the stator may have a stator core formed by a pressure-molded body of soft magnetic powder whose surfaces are coated with insulating films.

DETAILS OF EMBODIMENTS

Hereinafter, preferable embodiments will be described with reference to the drawings.

At least some parts of the embodiments described below may be combined together as desired.

[Structure of Axial Gap Motor]

Figure 1:
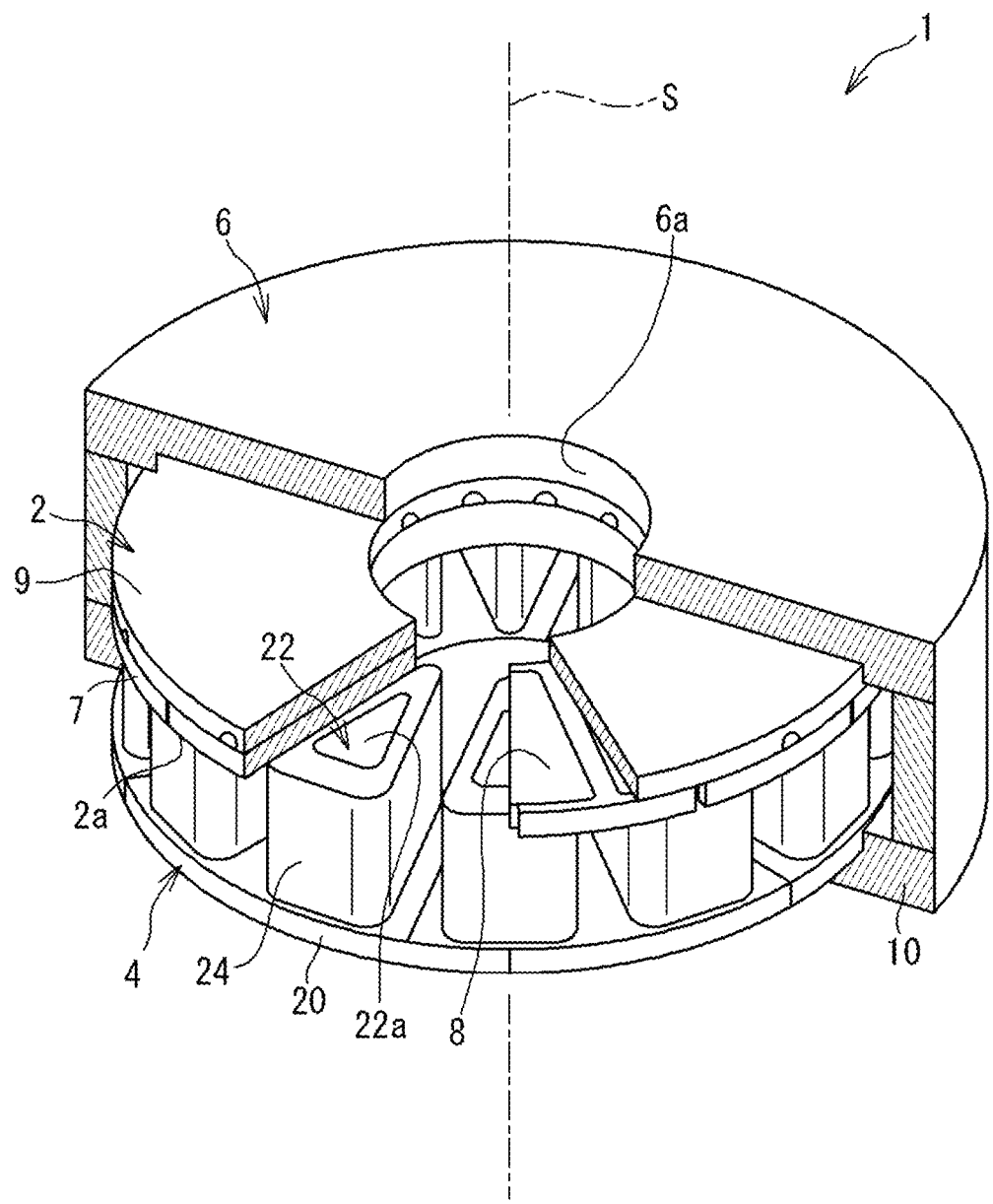
FIG. 1 is a perspective view showing the structure of an axial gap motor according to an embodiment.

FIG. 1 is a perspective view showing the structure of an axial gap motor according to an embodiment. In FIG. 1, a part of the structure is not shown, for the purpose of showing the internal structure.

In FIG. 1, an axial gap motor 1 is a motor in which a gap between a rotor and a stator is provided in the axial direction, and includes a disk-shaped rotor 2, a stator 4, and a housing 6 storing these, thus having a single-stator structure.

In FIG. 1, a rotary shaft inserted into a hole portion 6a of the housing 6 and provided rotatably relative to the housing 6, is not shown. It is noted that the axial direction is a direction parallel to an axis S of the rotary shaft.

The rotor 2 has an annular shape and is fixed to the rotary shaft (not shown) so as to be rotatable integrally therewith.

The rotor 2 includes an annular body portion 7 having a plurality of magnets 8, and an annular rotor yoke 9 fixed concentrically to the body portion 7.

The rotor 2 will be described in detail later.

The stator 4 is provided so as to be opposed to one surface 2a of the rotor 2 with a gap provided therebetween in the axial direction. The stator 4 has an annular shape and is provided concentrically with the rotor 2. The stator 4 is fixed to a cover 10 of the housing 6. Thus, the rotor 2 and the stator 4 are configured to be rotatable relative to each other.

The stator 4 includes a stator core 20, and a plurality of coils 24 wound around a plurality of tooth portions 22 that the stator core 20 has.

The stator core 20 is formed by a soft magnetic powder core. The soft magnetic powder core is a pressure-molded body of soft magnetic powder whose surfaces are coated with insulating films.

End surfaces 22a of the plurality of tooth portions 22 wound with the coils 24 are opposed to the one surface 2a of the rotor 2. The gap is formed between the end surfaces 22a of the plurality of tooth portions 22 and the one surface 2a of the rotor 2.

[Rotor According to First Embodiment]

As described above, the rotor 2 includes the body portion 7 and the rotor yoke 9.

Figure 2:
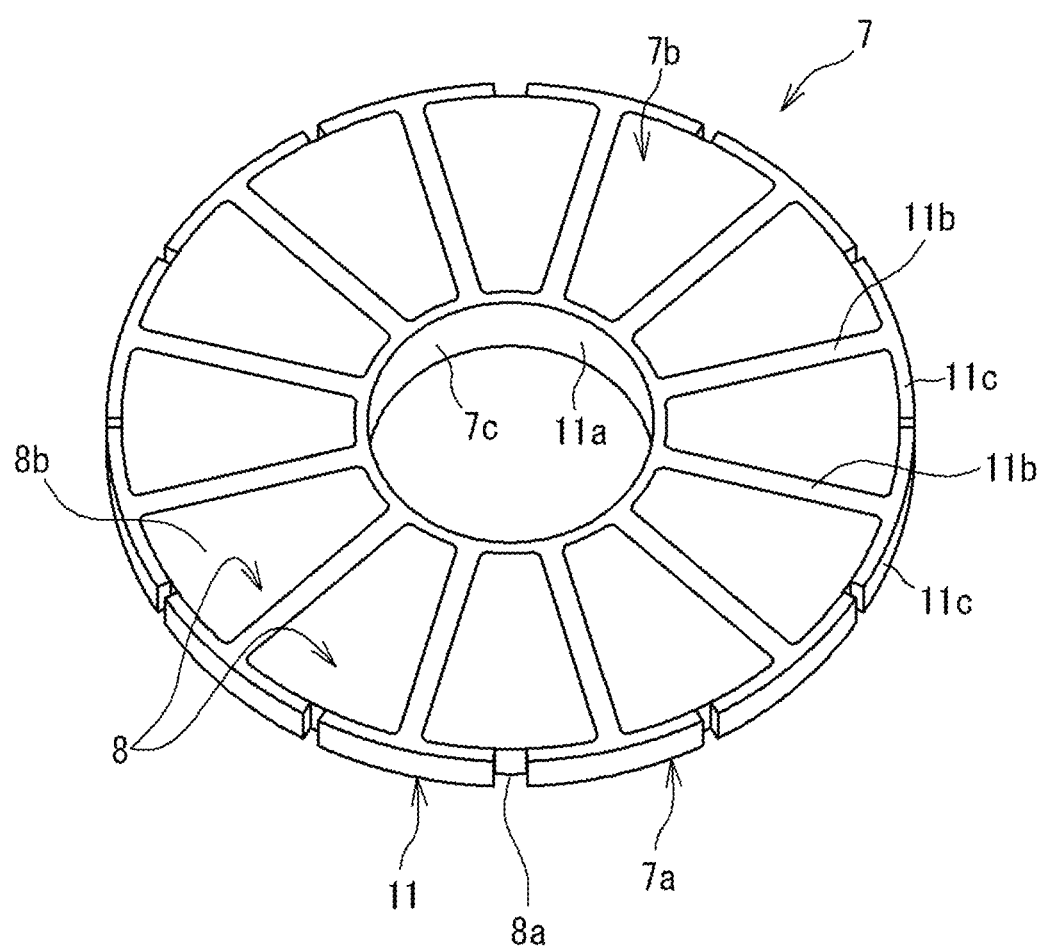
FIG. 2 is an external view of a body portion according to the first embodiment.

FIG. 2 is an external view of the body portion 7.

As shown in FIG. 2, the body portion 7 is formed in an annular plate shape having a hole portion 7c through which the rotary shaft is inserted. The plurality of magnets 8 are held by a holding member 11 made of a non-magnetic material such as austenite-based stainless steel, for example.

As the plurality of magnets 8, neodymium bonded magnets, neodymium sintered magnets, or the like are used. The material used as the magnet 8 preferably satisfies a condition that the remanent magnetization (Br) thereof is 0.7 T (tesla) or greater.

The plurality of magnets 8 are each formed in a plate shape. One surface 8a and another surface 8b of each of the plurality of magnets 8 are exposed on one surface 7a and another surface 7b of the body portion. The outer shape of each of the plurality of magnets 8 is a sector shape having a small-diameter arc and a large-diameter arc.

The plurality of magnets 8 are arranged in an annular shape along the circumferential direction.

The one surface 8a and the other surface 8b of each of the plurality of magnets 8 are magnetic pole surfaces. Among the plurality of magnets 8, the magnets 8 adjacent to each other are arranged such that magnetic poles of their one surfaces 8a (other surfaces 8b) are different from each other. That is, magnetic poles of the one surfaces 8a (other surfaces 8b) of the plurality of magnets 8 are alternately different along the circumferential direction.

The holding member 11 includes an annular portion 11a, a plurality of pillar portions 11b radially extending outward in the radial direction from the annular portion 11a, and outer periphery holding portions 11c provided at ends of the plurality of pillar portions 11b.

The annular portion 11a contacts the inner peripheral surfaces of the plurality of magnets 8. The pillar portions 11b are interposed between the magnets 8 adjacent to each other in the circumferential direction and contact the radial-direction side surfaces of the plurality of magnets 8. The outer periphery holding portions 11c contact the outer peripheral surfaces of the plurality of magnets 8.

In this way, the holding member 11 contacts the peripheries of the plurality of magnets 8, thereby holding the plurality of magnets 8 in an annular shape.

As described above, the rotor yoke 9 is fixed to the other surface 7b of the body portion 7.

Figure 3:
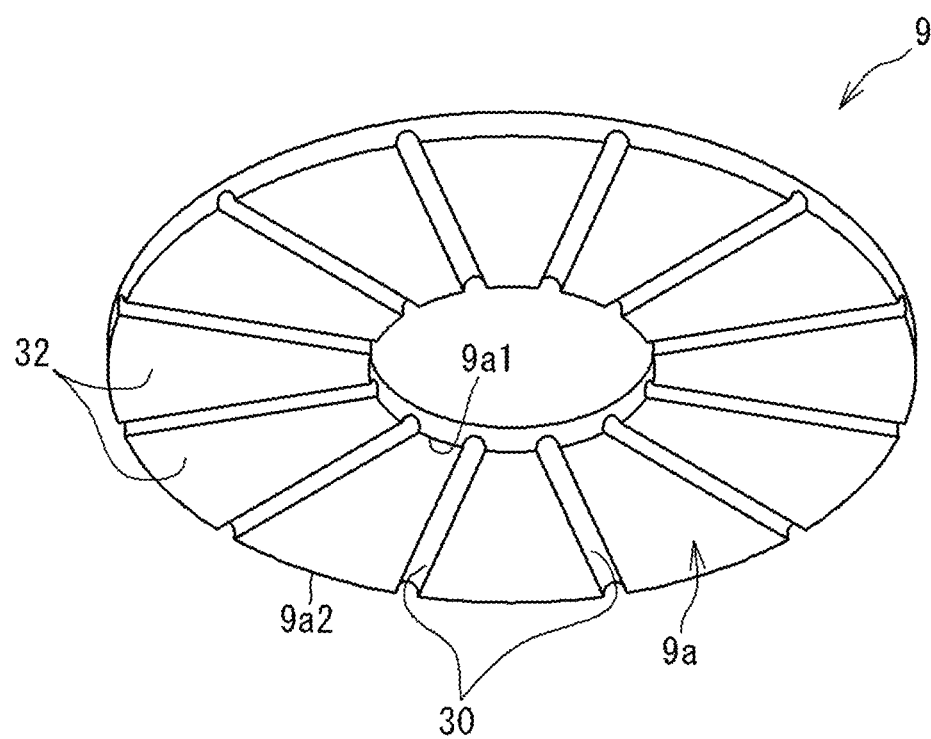
FIG. 3 is an external view of a rotor yoke according to the first embodiment.

FIG. 3 is an external view of the rotor yoke 9.

The rotor yoke 9 is formed in an annular plate shape, using a steel plate for a mechanical structure, for example. The material used as the rotor yoke 9 preferably satisfies a condition that the material is a magnetic material having a relative permeability of 100 or greater.

The inner diameter and the outer diameter of the rotor yoke 9 are almost equal to the inner diameter and the outer diameter of the body portion 7.

Therefore, when the rotor yoke 9 is fixed to the body portion 7, the inner circumferential surface and the outer circumferential surface of the rotor yoke 9 are almost flush with the inner circumferential surface and the outer circumferential surface of the body portion 7.

The rotor yoke 9 is fixed with its one surface 9a contacting the other surface 7b of the body portion 7.

As shown in FIG. 3, the one surface 9a of the rotor yoke 9 includes a plurality of recesses 30 extending from an inner circumferential edge 9a1 to an outer circumferential edge 9a2 on the one surface 9a, and a plurality of flat surface portions 32 connecting the adjacent recesses 30.

The plurality of recesses 30 are grooves recessed in the axial direction relative to the flat surface portions 32, and radially extend from the inner circumferential edge 9a1 to the outer circumferential edge 9a2 so as to correspond to the pillar portions 11b of the holding member 11.

The groove width dimension of the recess 30 is the same as the width dimension of the pillar portion 11b. In addition, the angular intervals in the circumferential direction of the recesses 30 are the same as the angular intervals in the circumferential direction of the pillar portions 11b.

The rotor yoke 9 is fixed to the other surface 7b of the body portion 7 in a state in which the plurality of recesses 30 and the plurality of pillar portions 11b match each other over the entire range in the radial direction.

Figure 4:
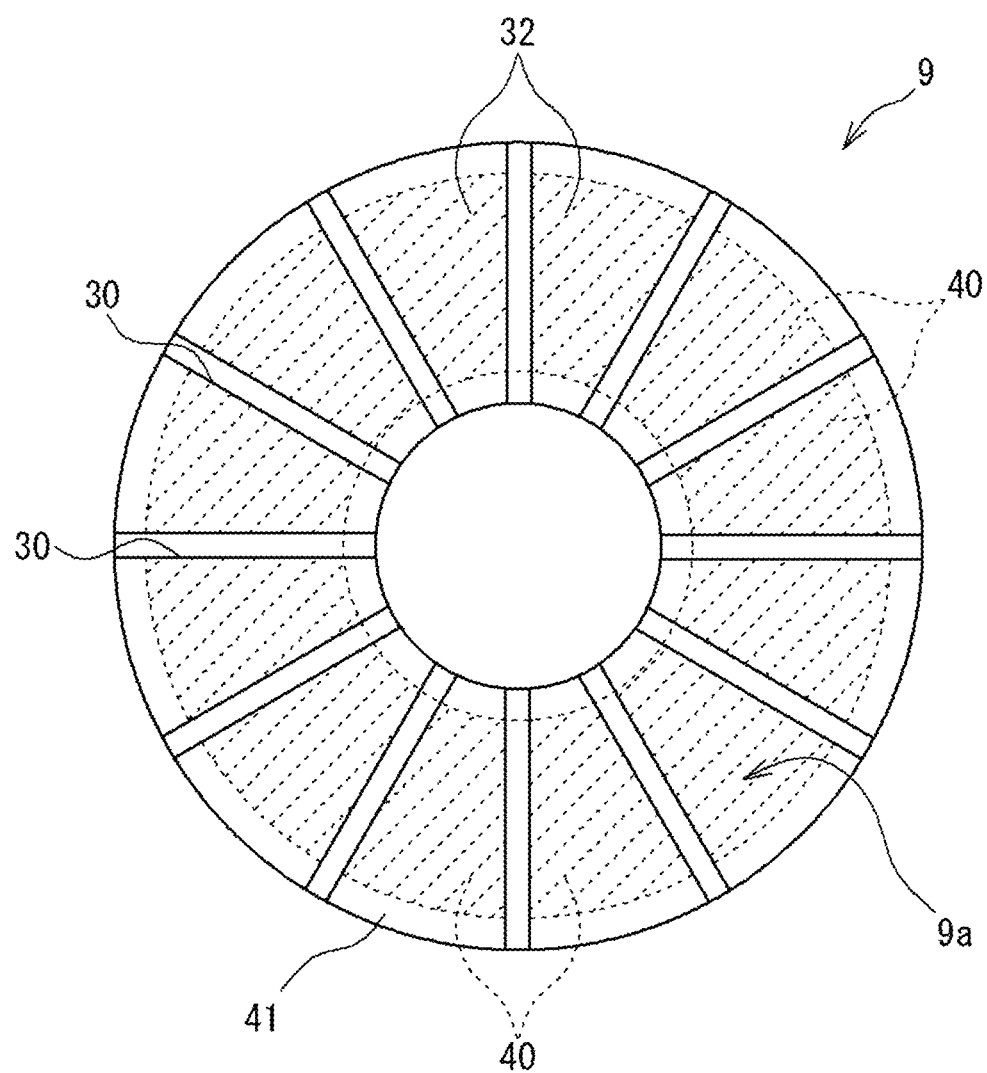
FIG. 4 is a view of one surface of a rotor yoke as viewed straightly from the axial direction.

FIG. 4 is a view of the one surface 9a of the rotor yoke 9 as viewed straightly from the axial direction.

The plurality of recesses 30 and the plurality of pillar portions 11b are set to match each other over the entire range in the radial direction. Therefore, the other surfaces 8b of the magnets 8 of the body portion 7 face and contact the respective flat surface portions 32.

The other surfaces 8b of the magnets 8 match a plurality of areas 40 hatched by broken lines on the flat surface portions 32. Thus, the areas 40 form a plurality of facing areas 40 facing and contacting the other surfaces 8b of the plurality of magnets 8.

On the other hand, the area other than the facing areas 40 on the one surface 9a is a non-facing area 41 not facing the other surfaces 8b of the plurality of magnets 8.

As shown in FIG. 4, the non-facing area 41 is present in the entire areas of the recesses 30 and in the vicinities of the inner peripheral edges and the outer peripheral edges of the flat surface portions 32.

That is, the non-facing area 41 includes partial areas located between pairs of the facing areas 40 adjacent to each other in the circumferential direction among the plurality of facing areas 40.

The recesses 30 are provided in, of the non-facing area 41, partial areas located between pairs of the facing areas 40 adjacent to each other in the circumferential direction.

Figure 5:
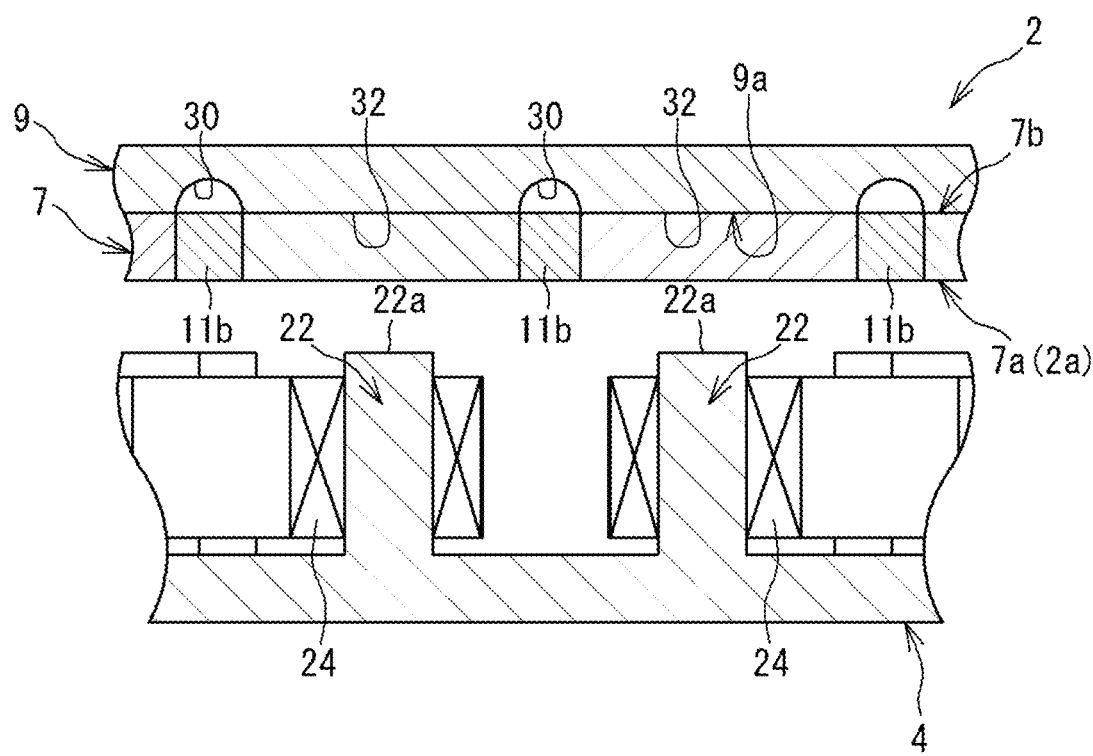
FIG. 5 is a partial sectional view of the axial gap motor.

FIG. 5 is a partial sectional view of the axial gap motor 1 and shows a cross-section perpendicular to one pillar portion 11b. The cross-section shown in FIG. 5 is a cross-section perpendicular to the pillar portion 11b at the center in FIG. 5.

As shown in FIG. 5, in a state in which the rotor yoke 9 is fixed to the body portion 7, the plurality of recesses 30 provided on the one surface 9a of the rotor yoke 9 match the plurality of pillar portions 11b.

As described above, the rotor 2 is provided so as to be opposed to the stator 4 with a gap provided therebetween in the axial direction.

More specifically, the one surface 7a of the body portion 7 (one surface 2a of the rotor 2) and the end surfaces 22a of the plurality of tooth portions 22 are opposed to each other.

Thus, the magnetic flux from the magnets 8 penetrates the coils 24 wound around the tooth portions 22 and becomes an magnetic flux linkage.

Figure 6:
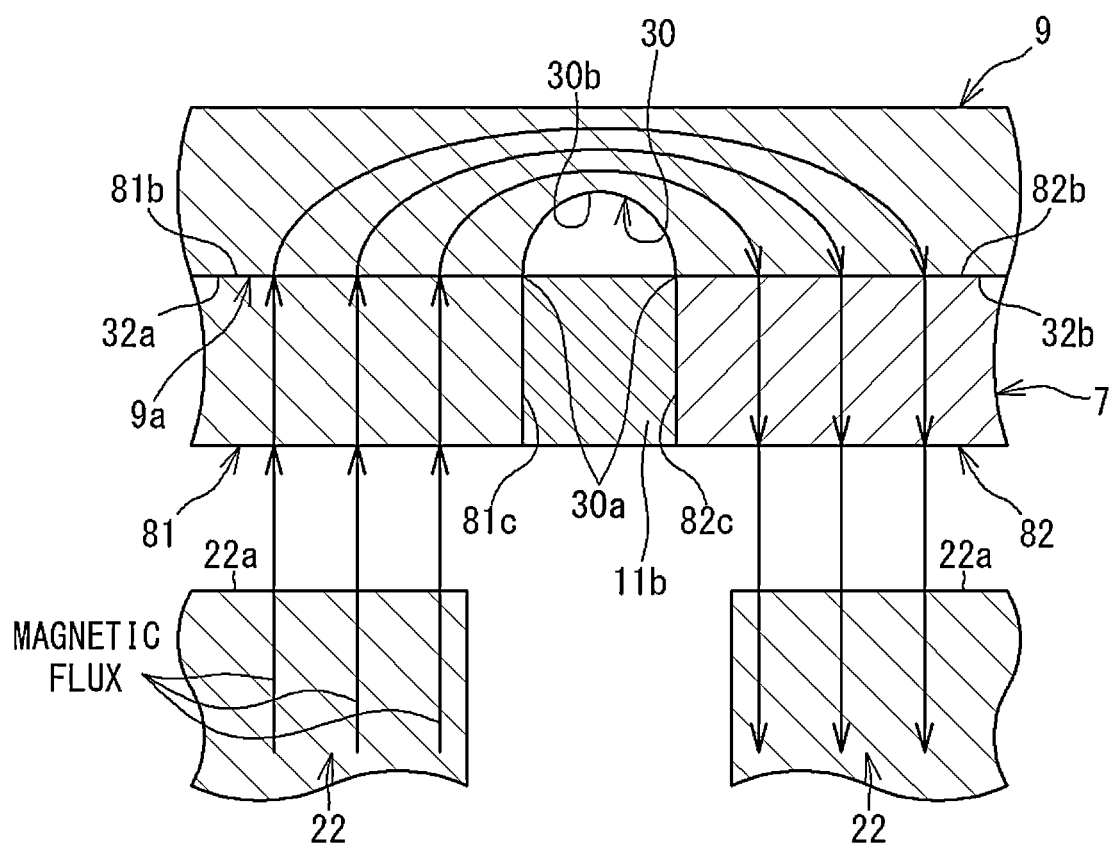
FIG. 6 is an enlarged view of a specific part in FIG. 5.

FIG. 6 is an enlarged view of a specific part in FIG. 5. Arrows in FIG. 6 indicate a magnetic flux flowing through respective parts. In FIG. 6, the magnet 8 at the left on the drawing sheet is referred to as magnet 81, and the magnet 8 at the right on the drawing sheet is referred to as magnet 82.

As described above, the groove width dimension of the recess 30 is the same as the width dimension of the pillar portion 11b. Therefore, one opening edge 30a of the recess 30 matches the boundary between the pillar portion 11b and the magnet 81, and the other opening edge 30a matches the boundary between the pillar portion 11b and the magnet 82.

Preferably, the depth dimension of the recess 30 is set to be not greater than 50% of the thickness dimension of the rotor yoke 9.

A flat surface portion 32a of the rotor yoke 9 contacts another surface 81b which is a magnetic pole surface (N pole) of the magnet 81. A flat surface portion 32b contacts another surface 82b which is a magnetic pole surface (S pole) of the magnet 82.

In FIG. 6, the magnetic flux from the magnet 81 flows from the other surface 81b of the magnet 81 through the rotor yoke 9 to the other surface 82b of the magnet 82.

The flow of the magnetic flux from the magnet 81 to the magnet 82 becomes an magnetic flux linkage which is a magnetic flux penetrating the coils 24 wound around the tooth portions 22.

In the present embodiment, on the one surface 9a of the rotor yoke 9, of the non-facing area 41, a partial area between a pair of facing areas 40 (flat surface portions 32a, 32b) adjacent to each other in the circumferential direction is formed to be the recess 30. Therefore, as compared to a case where there are no recesses as in the conventional example, a surface (the inner surface of the recess 30) of the rotor yoke 9 in the non-facing area 41 can be more separated from a side surface 81c of the magnet 81 and a side surface 82c of the magnet 82. Thus, the magnetic resistance between the surface (the inner surface of the recess 30) of the rotor yoke 9 in the non-facing area 41 and the side surface 81c of the magnet 81 (the side surface 82c of the magnet 82) can be increased.

Therefore, the surface (the inner surface of the recess 30) of the rotor yoke 9 in the non-facing area 41, the side surface 81c of the magnet 81 (the side surface 82c of the magnet 82), and the magnets can be inhibited from being magnetically short-circuited, and reduction in the magnetic flux linkage due to short-circuit can be inhibited. As a result, a larger amount of magnetic flux linkage can be generated, whereby output torque of the axial gap motor 1 can be increased.

As shown in FIG. 6, the sectional shape of the recess 30 across a range between the pair of facing areas 40 (flat surface portions 32a, 32b) is such a shape that the opening edges 30a and a bottom 30b of the recess 30 are connected by curved surfaces.

In this case, in the recess 30, the distance between the bottom 30b and a side wall portion from the opening edge 30a to the bottom 30b is inhibited from being shortened, and thus occurrence of magnetic short-circuit inside the recess 30 can be inhibited.

In the present embodiment, the recesses 30 are formed in groove shapes extending from the inner circumferential edge 9a1 to the outer circumferential edge 9a2 on the one surface 9a of the rotor yoke 9. Therefore, when providing the recesses 30, it becomes unnecessary to perform adjustment and the like for at least their positions in the radial direction, so that it becomes easy to provide the recesses 30.

[Rotor According to Second Embodiment]

Figure 7:
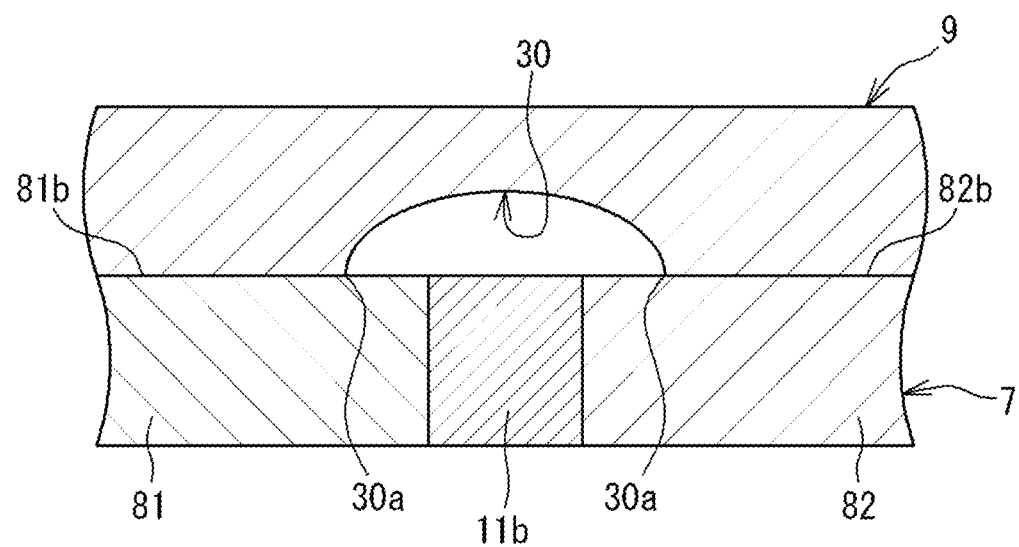
FIG. 7 is a partial sectional view of an axial gap motor according to the second embodiment.

FIG. 7 is a partial sectional view of an axial gap motor 1 according to the second embodiment.

The present embodiment is different from the first embodiment in that one opening edge 30a of the recess 30 is located on the other surface 81b which is a magnetic pole surface of the magnet 81, and the other opening edge 30a is located on the other surface 82b which is a magnetic pole surface of the magnet 82.

Also in the present embodiment, the inner surface of the recess 30 can be more separated from the magnet 81 (magnet 82), whereby the magnetic resistance between the inner surface of the recess 30 and the magnet 81 (magnet 82) can be increased.

In addition, in this case, the opening width of the recess 30 can be made greater than the predetermined interval between the pair of the magnets 8 adjacent to each other in the circumferential direction, and thus the recess 30 can be provided so as to assuredly include the non-facing area 41 in the circumferential direction.

For example, in a case where the opening width of the recess 30 is set to almost the same dimension as the predetermined interval between the pair of the magnets 8 adjacent to each other in the circumferential direction, there is a possibility that the opening edge 30a of the recess 30 is located on the pillar portion 11b due to component error, assembly error, or the like, and this can be a cause of occurrence of magnetic short-circuit.

In contrast, in the present embodiment, the recess 30 can be provided so as to assuredly include the non-facing area 41 in the circumferential direction. Therefore, occurrence of magnetic short-circuit as described above can be inhibited, and the magnetic resistance between the inner surface of the recess 30 and the magnet 81 (magnet 82) can be increased.

[Evaluation Test]

Hereinafter, a result of an evaluation test conducted for output torque of the axial gap motor 1 according to the present embodiment will be described.

The evaluation test was conducted as follows. The axial gap motor 1 of the first embodiment was used as an example product, and an axial gap motor different from the example product only in that no groove portions were provided to the rotor yoke was used as a comparative example product. The output torques of the example product and the comparative example product were calculated through a simulation by CAE, and were compared with each other.

The output torque obtained from the example product was 4.96 Nm, and the output torque obtained from the comparative example product was 4.80 Nm.

From the above result, it has been found that the axial gap motor of the present embodiment makes it possible to increase the output torque.

[Others]

The embodiments disclosed here are merely illustrative in all aspects and should not be recognized as being restrictive.

For example, in the above embodiments, the case where the recesses 30 are provided to the rotor yoke 9 of the axial gap motor 1 as a rotating electric machine, has been shown. However, the same recesses may be provided to a rotor yoke of an axial-gap-type power generator. In this case, the output of the power generator can be increased.

In the above embodiments, the case where the recess 30 is provided in a groove shape in, of the non-facing area 41, a partial area located between the pair of facing areas 40 adjacent to each other in the circumferential direction, has been shown. However, multiple recesses may be formed to be arrayed in, of the non-facing area 41, a partial area between the pair of facing areas 40 adjacent to each other in the circumferential direction.

In the above embodiments, the case where the recess 30 is provided so as to extend from the inner circumferential edge 9a1 to the outer circumferential edge 9a2 on the one surface 9a of the rotor yoke 9, has been shown. However, the recess 30 need not extend to areas other than the partial area between the pair of facing areas 40 adjacent to each other in the circumferential direction, on the non-facing area 41. Therefore, the recess 30 does not necessarily need to extend to areas that are other than the area between the pair of facing areas 40 and are present in the vicinities of the inner circumferential edge 9a1 and the outer circumferential edge 9a2 on the one surface 9a of the rotor yoke 9.

In the above embodiments, the case where the sectional shape of the recess 30 across a range between the pair of facing areas is such a shape that the opening edges 30a and the bottom 30b of the recess 30 are connected by curved surfaces, has been shown. However, the sectional shape of the recess 30 may be another shape such as a rectangular shape or a polygonal shape as long as the sectional shape is recessed in the axial direction.

The scope of the present disclosure is defined by the scope of the claims rather than by the description above, and is intended to include meaning equivalent to the scope of the claims and all modifications within the scope.

REFERENCE SIGNS LIST 1 axial gap motor
2 rotor
2a one surface
4 stator
6 housing
6a hole portion
7 body portion
7a one surface
7b other surface
7c hole portion
8 magnet
8a one surface
8b other surface
9 rotor yoke
9a one surface
9a1 inner circumferential edge
9a2 outer circumferential edge
10 cover
11 holding member
11a annular portion
11b pillar portion
11c outer periphery holding portion
20 stator core
22 tooth portion
22a end surface
24 coil
30 recess
30a opening edge
30b bottom
32, 32a, 32b flat surface portion
40 facing area
41 non-facing area
81 magnet
81b other surface
81c side surface
82 magnet
82b other surface
82c side surface
S axis

The invention claimed is:

1. A rotating electric machine comprising:
a stator; and
a rotor provided so as to be opposed to the stator in an axial direction, wherein
the rotor includes
an annular rotor yoke, and
a plurality of magnets provided to contact one surface of the rotor yoke so as to be arranged at predetermined intervals along a circumferential direction with magnetic poles thereof being different alternately, the one surface being adjacent to the stator,
the one surface includes a plurality of facing areas facing and contacting the plurality of magnets, and a non-facing area not facing the plurality of magnets,
the non-facing area includes partial areas each located between a pair of the facing areas adjacent to each other in the circumferential direction among the plurality of facing areas, and
the partial areas are formed to be recesses recessed in the axial direction relative to the facing areas.

2. The rotating electric machine according to claim 1, wherein
a sectional shape of each recess across a range between the pair of facing areas is such a shape that opening edges and a bottom of the recess are connected by curved surfaces.

3. The rotating electric machine according to claim 1, wherein
each recess extends from an inner circumferential edge to an outer circumferential edge on the one surface.

4. The rotating electric machine according to claim 1, wherein
the stator has a stator core formed by a pressure-molded body of soft magnetic powder whose surfaces are coated with insulating films.

5. A rotating electric machine comprising:
a stator; and
a rotor provided so as to be opposed to the stator in an axial direction, wherein
the rotor includes
an annular rotor yoke, and
a plurality of magnets provided to contact one surface of the rotor yoke so as to be arranged at predetermined intervals along a circumferential direction with magnetic poles thereof being different alternately,
the one surface includes a plurality of facing areas facing and contacting the plurality of magnets, and a non-facing area not facing the plurality of magnets,
the non-facing area includes partial areas each located between a pair of the facing areas adjacent to each other in the circumferential direction among the plurality of facing areas, and
the partial areas are formed to be recesses recessed in the axial direction relative to the facing areas, wherein
opening edges of each recess formed by edges of the pair of facing areas are located on magnetic pole surfaces of a pair of the magnets contacting the pair of facing areas among the plurality of magnets.

* * * * *